(12) United States Patent
Inoue

(10) Patent No.: US 11,697,409 B2
(45) Date of Patent: Jul. 11, 2023

(54) VEHICLE CONTROL APPARATUS

(71) Applicant: TOYOTA JIDOSHA KABUSHIKI KAISHA, Toyota (JP)

(72) Inventor: Kota Inoue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 17/366,577

(22) Filed: Jul. 2, 2021

(65) Prior Publication Data
US 2022/0009481 A1 Jan. 13, 2022

(30) Foreign Application Priority Data

Jul. 8, 2020 (JP) ................. 2020-117741

(51) Int. Cl.
*B60W 50/029* (2012.01)
*B60W 30/06* (2006.01)
(Continued)

(52) U.S. Cl.
CPC ............ *B60W 30/06* (2013.01); *B60W 10/18* (2013.01); *B60W 10/20* (2013.01); *B60W 50/0205* (2013.01); *B60W 50/029* (2013.01); *H04W 4/40* (2018.02); *B60W 2050/021* (2013.01); *B60W 2510/182* (2013.01); *B60W 2540/18* (2013.01)

(58) Field of Classification Search
CPC ...... B60W 30/06; B60W 10/18; B60W 10/20; B60W 50/0205; B60W 50/029; B60W 2050/021; B60W 2510/182; B60W 2540/18; B60W 2050/0292; B60W 2050/0297; B60W 2510/244; B60W 2710/1005; B60W 2710/182; B60W 10/04; B60W 10/10; B60W 2050/0064;
(Continued)

(56) References Cited

U.S. PATENT DOCUMENTS 7,235,897 B2 * 6/2007 Yokoyama ............. B60K 6/485
307/9.1
2007/0223910 A1 9/2007 Aoki et al.
(Continued)

FOREIGN PATENT DOCUMENTS

CN 111086515 A * 5/2020 ............. B60T 13/74
DE 102017209570 A1 * 12/2018
(Continued)

*Primary Examiner* — B M M Hannan
(74) *Attorney, Agent, or Firm* — Sughrue Mion, PLLC

(57) ABSTRACT

Provided is a control apparatus for a vehicle configured to perform parking assist control, the control apparatus including a first power supply device, a second power supply device, and a power supply circuit, the power supply circuit being configured to, when an abnormality occurs in the first power supply device during the performance of the parking assist control, supply an electric power from the second power supply device to a braking device and a shift switching device, and the braking device and the shift switching device being configured to operate such that a timing at which a current flowing from the second power supply device to the braking device reaches a maximum value and a timing at which a current flowing from the second power supply device to the shift switching device reaches a maximum value do not overlap.

5 Claims, 6 Drawing Sheets

(51) Int. Cl.
  *B60W 50/02* (2012.01)
  *B60W 10/18* (2012.01)
  *H04W 4/40* (2018.01)
  *B60W 10/20* (2006.01)

(58) Field of Classification Search
  CPC .... B60W 10/11; B60W 10/184; B60W 10/26; B60W 2520/28; H04W 4/40
  USPC .......................................................... 701/41
  See application file for complete search history.

(56) References Cited

U.S. PATENT DOCUMENTS

| | | | | |
|---|---|---|---|---|
| 2016/0036371 | A1* | 2/2016 | Yamasaki | B62D 5/046 318/400.22 |
| 2016/0304087 | A1* | 10/2016 | Noh | B60R 25/24 |
| 2016/0311419 | A1* | 10/2016 | Joyce | B60T 8/171 |
| 2018/0105165 | A1* | 4/2018 | Alarcon | B60W 50/029 |
| 2019/0111917 | A1* | 4/2019 | Kim | G07C 5/0841 |
| 2019/0193707 | A1* | 6/2019 | Deljosevic | B60T 7/107 |
| 2019/0232902 | A1* | 8/2019 | Teng | B60R 16/033 |
| 2019/0299944 | A1* | 10/2019 | Nilsson | B60T 13/741 |
| 2019/0302759 | A1* | 10/2019 | Golsch | G06F 3/0488 |
| 2019/0347934 | A1* | 11/2019 | Hase | G05D 1/0022 |
| 2019/0385449 | A1* | 12/2019 | Pateropoulos | G08G 1/052 |
| 2020/0062308 | A1* | 2/2020 | Kim | B60W 30/06 |
| 2020/0143682 | A1* | 5/2020 | Chow | G08G 1/0112 |
| 2021/0009102 | A1* | 1/2021 | Nakayama | B60T 8/885 |
| 2021/0188233 | A1* | 6/2021 | Yuyama | B60T 8/92 |
| 2021/0339725 | A1* | 11/2021 | Adler | B60T 13/58 |
| 2022/0017107 | A1* | 1/2022 | Shinoda | B60W 50/029 |
| 2022/0017108 | A1* | 1/2022 | Komatsu | B60W 50/0205 |

FOREIGN PATENT DOCUMENTS

| | | | |
|---|---|---|---|
| JP | 2007-253748 A | 10/2007 | |
| JP | 2008-298016 A | 12/2008 | |
| JP | 2015003565 A | 1/2015 | |
| JP | 2015-101225 A | 6/2015 | |
| JP | 7156008 B2 * | 10/2022 | B60R 16/03 |

* cited by examiner

VEHICLE CONTROL APPARATUS

CROSS-REFERENCES TO RELATED APPLICATION

The present application claims priority to Japanese patent application No. JP 2020-117741 filed on Jul. 8, 2020, the content of which is hereby incorporated by reference in its entirety.

BACKGROUND

1. Technical Field

The present disclosure relates to a vehicle control apparatus configured to perform parking assist control or automated driving control.

2. Description of the Related Art

Hitherto, there has been known a control apparatus for a vehicle configured to perform parking assist control such that the vehicle moves to a target region set in accordance with a surroundings situation of the vehicle (see Patent Document 1: Japanese Patent Application Laid-open No. 2015-101225).

An apparatus (hereinafter, referred to as "related-art apparatus") disclosed in Patent Document 1 can perform the parking assist control in a situation in which a driver gets off the vehicle. Such control is also referred to as "remote parking assist control".

After the driver gets off the vehicle, he/she operates a remote controller (transmitter). The remote controller transmits a signal for starting the parking assist control to the related-art apparatus in response to the operation by the driver. Upon receiving the signal, the related-art apparatus determines whether a remaining amount of an electric power source (battery) mounted on the vehicle is equal to or less than a predetermined threshold. The related-art apparatus changes a shift position of a transmission to a neutral position when the remaining amount of the electric power source is equal to or less than the threshold. According to this configuration, even in a situation in which an engine is not started due to the shortage of the electric power source, the driver applies a force from the outside of the vehicle to thereby move the vehicle.

SUMMARY

There is a case in which an abnormality (failure) occurs in the electric power source during the performance of the remote parking assist control. However, in the related-art apparatus, no consideration has been given to what to do when such a case occurs. When the abnormality occurs in the electric power source during the performance of the remote parking assist control, the electric power of the electric power source is not supplied to at least a braking device, and therefore, a braking force cannot be applied to wheels of the vehicle. Further, since the driver gets off the vehicle, the driver cannot operate a brake pedal. Therefore, the vehicle may continue to move. Such a problem may also occur in other automated driving control. For example, during the performance of the automated driving control (for example, level 3 or higher), the driver does not perform a driving operation. If an abnormality occurs in the electric power source during the performance of the automated driving control, the driver cannot immediately operate to stop the vehicle, and therefore, the vehicle may continue to move.

The present disclosure provides a vehicle control apparatus capable of stopping the vehicle when an abnormality occurs in the electric power source while the remote parking assist control or the automated driving control is performed.

In one or more embodiments, there is provided a control apparatus for a vehicle. The control apparatus includes: a driving device configured to apply a driving force to a drive wheel among wheels of the vehicle; a braking device configured to apply a braking force to the wheels; a shift switching device configured to switch a shift position of a transmission of the vehicle to one of a plurality of positions including a forward drive position, a reverse drive position, and a parking position; a steering device configured to control a steering angle of a steered wheel among the wheels; a controller configured to receive an assist request transmitted from a portable device via wireless communication, determine, in response to the received assist request, a movement path along which the vehicle can be moved from a current position of the vehicle to a predetermined target position, and perform parking assist control for controlling the driving device, the braking device, the shift switching device, and the steering device such that the vehicle moves along the determined movement path; a first power supply device mounted on the vehicle, and having a first power supply capacity; a second power supply device mounted on the vehicle, and having a second power supply capacity smaller than the first power supply capacity; and a power supply circuit configured to, when the first power supply device is normal during the performance of the parking assist control, supply an electric power from the first power supply device to the driving device, the braking device, the shift switching device, the steering device, and the controller, and when an abnormality occurs in the first power supply device during the performance of the parking assist control, supply an electric power from the second power supply device to the braking device and the shift switching device. When the abnormality occurs in the first power supply device during the performance of the parking assist control, the braking device performs first control and the shift switching device performs second control such that a timing at which a current flowing from the second power supply device to the braking device reaches a maximum value and a timing at which a current flowing from the second power supply device to the shift switching device reaches a maximum value do not overlap. The first control is control for applying the braking force to the wheels, and the second control is control for switching the shift position to the parking position.

According to the above configuration, when the abnormality occurs in the first power supply device while the parking assist control is being performed in a state in which a driver gets off the vehicle, the braking device performs the first control using the electric power of the second power supply device, and the shift switching device performs the second control using the electric power of the second power supply device. Here, the timing at which the current flowing from the second power supply device to the braking device reaches the maximum value (peak) does not overlap with the timing at which the current flowing from the second power supply device to the shift switching device reaches the maximum value (peak). Therefore, it is possible to prevent the voltage of the second power supply device from being rapidly decreased. Even in the configuration in which the second power supply device has the second power supply capacity smaller than the first power supply capacity, the braking device and the shift switching device operate normally to thereby stop the vehicle.

In one or more embodiments, the braking device is configured to start the first control at a time point at which it is determined that the abnormality occurs in the first power supply device. The shift switching device is configured to start the second control when a predetermined time has elapsed since the time point at which it is determined that the abnormality occurs in the first power supply device.

According to the above configuration, when the abnormality occurs in the first power supply device, the current flowing from the second power supply device to the braking device first reaches the maximum value and then is decreased. After the current flowing from the second power supply device to the braking device is thus decreased, the current flowing from the second power supply device to the shift switching device reaches the maximum value. Therefore, it is possible to prevent the voltage of the second power supply device from being rapidly decreased. This enables to enhance the possibility that the shift switching device switches the shift position to the parking position in the state in which the vehicle is stopped.

In one or more embodiments, the braking device is configured to perform, as the first control, a pressure increasing process for increasing a braking pressure of a wheel cylinder of the wheel and a pressure maintaining process for maintaining the braking pressure of the wheel cylinder of the wheel. The predetermined time is set to be longer than a period during which the braking device performs the pressure increasing process.

In one or more embodiments, the braking device is configured to communicate with the controller during the performance of the parking assist control, and when the communication with the controller is interrupted for a predetermined time threshold or longer, determine that the abnormality occurs in the first power supply device, and perform the first control. The shift switching device is configured to communicate with the controller during the performance of the parking assist control, and when the communication with the controller is interrupted for the predetermined time threshold or longer, determine that the abnormality occurs in the first power supply device, and perform the second control.

In one or more embodiments, there is provided a control apparatus for a vehicle. The control apparatus includes: a driving device configured to apply a driving force to a drive wheel among wheels of the vehicle; a braking device configured to apply a braking force to the wheels; a shift switching device configured to switch a shift position of a transmission of the vehicle to one of a plurality of positions including a forward drive position, a reverse drive position, and a parking position; a steering device configured to control a steering angle of a steered wheel among the wheels; a controller configured to perform automated driving control for automatically controlling the driving device, the braking device, the shift switching device, and the steering device; a first power supply device mounted on the vehicle, and having a first power supply capacity; a second power supply device mounted on the vehicle, and having a second power supply capacity smaller than the first power supply capacity; and a power supply circuit configured to, when the first power supply device is normal during the performance of the automated driving control, supply an electric power from the first power supply device to the driving device, the braking device, the shift switching device, the steering device, and the controller, and when an abnormality occurs in the first power supply device during the performance of the automated driving control, supply an electric power from the second power supply device to the braking device and the shift switching device. When the abnormality occurs in the first power supply device during the performance of the automated driving control, the braking device performs first control and the shift switching device performs second control such that a timing at which a current flowing from the second power supply device to the braking device reaches a maximum value and a timing at which a current flowing from the second power supply device to the shift switching device reaches a maximum value do not overlap. The first control is control for applying the braking force to the wheels, and the second control is control for switching the shift position to the parking position.

According to one or more embodiments, one or more of the above-mentioned controller is implemented by a microprocessor programmed for performing one or more operations and/or functionality described herein. In addition, the controller may be implemented, in whole or in part, by specifically configured to hardware (e.g., by one or more application specific integrated circuits or ASIC(s)).

DESCRIPTION OF THE EMBODIMENTS

Figure 1:
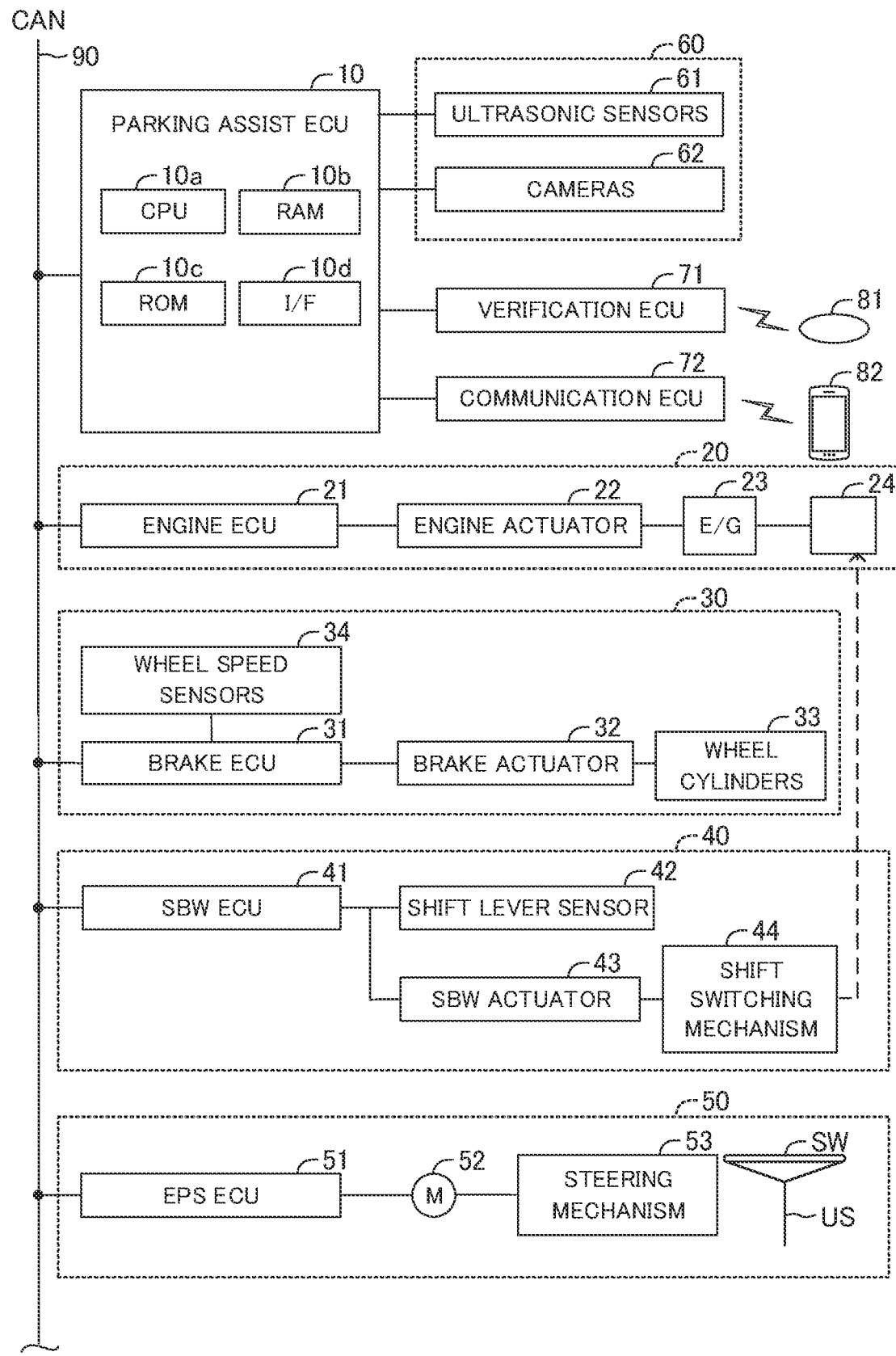
FIG. 1 is a schematic configuration diagram of a control apparatus for a vehicle according to at least one embodiment.

A control apparatus according to one or more embodiments is applied to a vehicle. The vehicle to which the control apparatus is applied is sometimes referred to as "host vehicle" for distinction from other vehicles. As illustrated in FIG. 1, the vehicle includes a parking assist ECU 10, a driving device 20, a braking device 30, a shift switching device 40, and a steering device 50.

The ECU herein stands for "electric control unit". The ECU includes a microcomputer including a central processing unit (CPU), a random-access memory (RAM), a read-only memory (ROM), an interface, and other components. The CPU is configured to execute instructions stored in the ROM to implement various functions. For example, the parking assist ECU 10 includes a microcomputer including a CPU10$a$, a RAM 10$b$, a ROM 10$c$, an interface (I/F) 10$d$, and other components.

The parking assist ECU 10 is connected to other various ECUs 21, 31, 41, 51, 71 and 72 described later via a controller area network (CAN) 90 such that information can be transmitted and received to and from each other.

The driving device 20 is configured to generate a driving force, and apply the driving force to drive wheels among front left, front right, rear left, and rear right wheels. The driving device 20 includes an engine ECU 21, an engine actuator 22, an engine 23, a transmission 24, a driving force transmission mechanism (not shown) for transmitting the driving force to the drive wheels, and other components. The engine ECU 21 is connected to the engine actuator 22. The engine actuator 22 includes a throttle valve actuator configured to change an opening degree of a throttle valve of the engine 23. The engine ECU 21 can drive the engine actuator 22 to change a torque to be generated by the engine 23. The torque (hereinafter, referred to as "driving torque") generated by the engine 23 is transmitted to the drive wheels via the transmission 24 and the driving force transmission mechanism. Thus, the engine ECU 21 can control the engine actuator 22 to control the driving force of the vehicle.

When the vehicle is a hybrid vehicle, the engine ECU 21 can control the driving force of the vehicle to be generated by any one of or both of "an engine and an electric motor" serving as vehicle driving sources. Further, when the vehicle is an electric vehicle, the engine ECU 21 can control the driving force of the vehicle to be generated by an electric motor serving as a vehicle driving source.

The braking device 30 is configured to apply a braking force to the wheels. The braking device 30 includes a brake ECU 31, a brake actuator 32, wheel cylinders 33, wheel speed sensors 34, and other components. The brake ECU 31 is connected to the brake actuator 32. The brake actuator 32 includes a well-known hydraulic circuit. The hydraulic circuit includes a reservoir (not shown), an oil pump (not shown), various valve devices (not shown) and the like. The brake actuator 32 adjusts a hydraulic pressure (i.e., braking pressure) supplied to the wheel cylinders 33 in accordance with a command sent from the brake ECU 31. A friction braking force on each wheel is changed according to the braking pressure. Thus, the brake ECU 31 can control the brake actuator 32 to control the braking force of the vehicle.

The brake ECU 31 is connected to the wheel speed sensors 34. Each of the wheel speed sensors 34 is configured to generate a signal indicative of a rotational angular velocity of each wheel (the front left wheel, the front right wheel, the rear left wheel, or the rear right wheel). The brake ECU 31 calculates a vehicle speed Vs (traveling speed of the vehicle) based on the signal generated by the wheel speed sensor.

The shift switching device 40 is configured to switch a shift position (gear position) of the transmission 24. The shift position includes a plurality of shift positions. In the present example, the shift position includes at least a parking position, a neutral position, a forward drive position, and a reverse drive position. When the shift position is the parking position, the shift switching device 40 mechanically locks the wheels such that the driving torque is not transmitted to the drive wheels and the wheels cannot be rotated. Specifically, when the shift position becomes the parking position, an output shaft of the transmission 24 is locked such that the output shaft cannot be rotated. Such a state is also referred to as "parking lock state (or P lock state)". In addition, when the shift position is the neutral position, the shift switching device 40 does not transmit the driving torque to the drive wheels. However, when the shift position is the neutral position, the shift switching device 40 does not mechanically lock the wheels. When the shift position is the forward drive position, the shift switching device 40 transmits the driving torque to the drive wheels such that the driving torque becomes the driving force for causing the vehicle to move forward. When the shift position is the reverse drive position, the shift switching device 40 transmits the driving torque to the drive wheels such that the driving torque becomes the driving force for causing the vehicle to move backward.

The shift switching device 40 includes an SBW (shift-by-wire) ECU 41, a shift lever sensor 42, an SBW actuator 43, a shift switching mechanism 44, and the like. The SBW ECU 41 is connected to the shift lever sensor 42 and the SBW actuator 43. The shift lever sensor 42 detects the position of the shift lever. The SBW ECU 41 is configured to receive the position of the shift lever from the shift lever sensor 42, and control the SBW actuator 43 based on the position of the shift lever. The SBW actuator 43 controls the shift switching mechanism 44 in accordance with a command from the SBW ECU 41, and switches the shift position of the transmission 24 to one among the plurality of shift positions (the parking position, the neutral position, the forward drive position, and the reverse drive position).

More specifically, when the position of the shift lever is "P", the SBW ECU 41 drives the SBW actuator 43 to control the shift switching mechanism 44 so that the shift position of the transmission 24 becomes the parking position. When the position of the shift lever is "N", the SBW ECU 41 drives the SBW actuator 43 to control the shift switching mechanism 44 so that the shift position of the transmission 24 becomes the neutral position. When the position of the shift lever is "D", the SBW ECU 41 drives the SBW actuator 43 to control the shift switching mechanism 44 so that the shift position of the transmission 24 becomes the forward drive position. When the position of the shift lever is "R", the SBW ECU 41 drives the SBW actuator 43 to control the shift switching mechanism 44 so that the shift position of the transmission 24 becomes the reverse drive position. Further, the SBW ECU 41 outputs to the parking assist ECU 10 the signal relating to the position of the shift lever received from the shift lever sensor 42.

The SBW ECU 41 can switch the shift position of the transmission 24 from the shift position other than the parking position to the parking position not only when the vehicle speed Vs is zero, but also when the vehicle speed Vs is equal to or less than a predetermined speed threshold Vsth (for example, 3 km/h).

The steering device 50 is configured to control a steering angle of the steered wheels (the front left wheel and the front right wheel) among the wheels. The steering device 50 includes an electric power steering ECU 51 (hereinafter, referred to as "EPS ECU 51"), an assist motor (M) 52, a steering mechanism 53, and the like. The EPS ECU 51 is connected to the assist motor 52. The assist motor 52 is incorporated in the steering mechanism 53. The steering mechanism 53 is a mechanism for steering the steered wheels in response to a rotating operation (steering operation) of a steering wheel SW. The steering mechanism 53 includes the steering wheel SW, a steering shaft US coupled to the steering wheel SW, a gear mechanism for steering (not shown), and the like. The EPS ECU 51 detects a steering torque input to the steering wheel SW by the driver through use of a steering torque sensor (not shown) provided in the steering shaft US, and drives the assist motor 52 based on the detected steering torque. The EPS ECU 51 applies a steering torque (steering assist torque) to the steering mechanism 53 through the drive of the assist motor 51 to thereby assist the steering operation by the driver.

Further, the parking assist ECU 10 transmits a steering command to the EPS ECU 51 during the performance of the parking assist control described later. When the EPS ECU 51 receives the steering command from the parking assist ECU 10 via the CAN 90, the EPS ECU 51 drives the assist motor 52 based on a steering torque identified by the steering command to thereby change the steering angle of the steered wheels of the vehicle.

Further, the parking assist ECU 10 is connected to vehicle peripheral sensors 60. The vehicle peripheral sensors 60 are configured to acquire vehicle peripheral information. The vehicle peripheral information includes information on objects present in a peripheral region of the vehicle, and information on partition lines drawn on a road surface in the peripheral region of the vehicle. The objects include, for example, moving objects such as automobiles, pedestrians, bicycles and the like, and motionless objects such as guardrails, fences and the like. The vehicle peripheral sensors 60 include a plurality of ultrasonic sensors 61, and a plurality of cameras 62.

Each of the ultrasonic sensors 61 transmits an ultrasonic wave having a pulse form in a predetermined range in the peripheral region of the vehicle, and receives a reflected wave reflected by the object. Each of the ultrasonic sensors 61 acquires object information based on a period from the transmission of the ultrasonic wave to the reception of the ultrasonic wave. The object information includes, for example, information on a reflection point which is a point on the object from which the transmitted ultrasonic wave has been reflected, and information on a distance between the ultrasonic sensor and the object.

Each of the plurality of cameras 62 is a digital camera incorporating an image pickup device such as a charge coupled device (CCD) and a CMOS image sensor (CIS). Each of the cameras 62 acquires image data on a peripheral state (including the position and shape of the object and the position and shape of the partition line) of the vehicle to be checked when the vehicle is parked at a parking space or exited from the parking space. Each of the cameras 62 outputs the image data to the parking assist ECU 10.

The parking assist ECU 10 receives the detection signal from each of the ultrasonic sensors 61 each time a predetermined time dT1 (hereinafter referred to as "first time dT1" for the sake of convenience) elapses. The parking assist ECU 10 plots the pieces of information included in the detection signal (i.e., the position of the reflection point which is a point from which the ultrasonic wave has been reflected) on a two-dimensional map. This two-dimensional map is a plan view in which the position of the vehicle is set as an origin, a travel direction of the vehicle is set as an X-axis, and a left direction of the vehicle is set as a Y-axis. The "position of the vehicle" is a predetermined center position of the vehicle in plan view. The parking assist ECU 10 detects the object present in the peripheral region of the vehicle based on the shape formed by a group of reflection points on the two-dimensional map, and identifies the position (distance and azimuth orientation) of the object with respect to the vehicle and the shape of the object.

The position of the vehicle may also be another specific position on the vehicle (e.g., a center position of the front left wheel and the front right wheel in plan view, a center position of the rear left wheel and the rear right wheel in plan view, or a geometric center position of the vehicle in plan view).

The parking assist ECU 10 acquires the image data from each of the cameras 62 each time the first time dT1 elapses. The parking assist ECU 10 detects the object present in the peripheral region of the vehicle by analyzing the image data, and identifies the position (distance and azimuth orientation) of the object with respect to the vehicle and the shape of the object. The parking assist ECU 10 draws on the above-mentioned two-dimensional map the object which has been detected based on the image data. In this manner, the parking assist ECU 10 can detect the object present in the peripheral region of the vehicle (within a predetermined distance range from the position of the vehicle) based on the information drawn on the two-dimensional map.

The parking assist ECU 10 detects a "region in which an object is not present" in the peripheral region of the vehicle based on the information drawn on the two-dimensional map. When the region in which an object is not present has a size and a shape that allow the vehicle to park (or exit from a parking space) with room to spare, the parking assist ECU 10 determines that region to be a "parking-possible region (exit-possible region)". When partition lines defining a parking space have been detected in the peripheral region of the vehicle, the parking-possible area is, for example, a rectangular area between the detected separation lines, with a long side that is longer than the length in the longitudinal direction of the vehicle by a first margin and a short side that is longer than the length in the lateral direction of the vehicle by a second margin.

Further, the parking assist ECU 10 is connected to a verification ECU 71 and a communication ECU 72. The verification ECU 71 is configured to transmit and receive information to and from a smart key 81 via wireless communication. The smart key 81 stores an identifier (hereinafter, referred to as "ID") for uniquely identifying the vehicle. The ID for uniquely identifying the vehicle is also stored in a ROM included in the verification ECU 71. The verification ECU 71 determines whether the ID transmitted from the smart key 81 matches the ID stored in the ROM of the verification ECU 71. When the ID transmitted from the smart key 81 matches the ID stored in the ROM of the verification ECU 71, the verification ECU 71 outputs a signal (hereinafter, referred to as "authentication completion signal") for notifying completion of user authentication to the parking assist ECU 10.

The communication ECU 72 is configured to transmit and receive information to and from a portable device 82 via wireless communication. The portable device 82 is, for example, a smartphone. An application (hereinafter, referred to as "parking application") for the parking assist control is installed in the portable device 82. The parking assist control is a well-known control for automatically moving the vehicle to a target region set in accordance with a surroundings situation of the vehicle. When the driver performs a predetermined operation on the parking application, the portable device 82 transmits, via wireless communication, to the communication ECU 72 a signal (hereinafter, referred to as "assist request signal") requesting assist/support for parking in a parking area or exiting from the parking area. When receiving the assist request signal from the portable device 82, the communication ECU 72 outputs the assist request signal to the parking assist ECU 10. Furthermore, the portable device 82 receives a display command from the parking assist ECU 10 through the communication ECU 72, and displays various information relating to the parking assist control on a display screen of the portable device 82 based on the display command.

(Parking Assist Control)

The user (driver) performs the predetermined operation on the parking application to transmit the assist request signal from the portable device 82 to the parking assist ECU 10 via the communication ECU 72. Further, an assist mode is set to either a parking mode or an exit mode by the parking application. The assist mode may be set by the user or may be automatically set according to the state of the vehicle and the surroundings situation of the vehicle. Thus, the assist request signal includes information on the assist mode.

The parking mode includes a perpendicular-parking mode and a parallel-parking mode. The perpendicular-parking mode is a mode for assisting parking of the vehicle by perpendicular-parking. "Perpendicular-parking" is to park the host vehicle in a direction perpendicular to a travel direction of a road being traveled along. The perpendicular-parking is synonymous with moving the host vehicle to park the host vehicle in parallel to other parked vehicles. More specifically, the perpendicular-parking refers to parking the host vehicle such that one side of the host vehicle is opposed to one side of another vehicle (first another vehicle) and the other side of the host vehicle is opposed to one side of another vehicle (second another vehicle), and a longitudinal direction axis passing through the center of the host vehicle in the vehicle width direction and a longitudinal direction axis passing through the center of each of the first and second another vehicles in the vehicle width direction are parallel to each other. The perpendicular-parking includes parking the host vehicle such that the host vehicle faces in a right-angle direction to the travel direction of the road being traveled along and at least one of the left and right sides of the host vehicle is parallel to "a white line, a wall, a fence, a guardrail, or the like".

The parallel-parking mode is a mode for assisting parking of the vehicle by parallel-parking. "Parallel-parking" is to park the host vehicle in a direction parallel to the travel direction of the road being traveled along. The parallel-parking is synonymous with parking the host vehicle to come into line with other vehicles parked along the travel direction of the road. More specifically, the parallel-parking refers to parking the host vehicle such that the front end portion of the host vehicle is opposed to the rear end portion (or front end portion) of the first another vehicle and the rear end portion of the host vehicle is opposed to the front end portion (or rear end portion) of the second another vehicle, and the longitudinal direction axis passing through the center of the host vehicle in the vehicle width direction and the longitudinal direction axis passing through the center of each of the first and second another vehicles in the vehicle width direction are positioned on substantially the same line.

The exit mode is a mode for assisting exit of a parked vehicle from a parking space. Specifically, the exit mode is a mode for assisting the movement of the parked vehicle to a traveling road.

When the parking mode (the perpendicular-parking mode or the parallel-parking mode) is selected as the assist mode, the parking assist ECU 10 sets, as a target region, a region occupied by a vehicle body on the assumption that the vehicle is parked in the parking-possible region. The parking assist ECU 10 sets, as a target position, the position of the vehicle at a point in time at which the vehicle completes parking to the target region. The target position is a position where the center position of the vehicle in plan view should reach.

The parking assist ECU 10 calculates a movement path along which the vehicle can be moved from the current position to the target position. The movement path is a path along which the center position of the vehicle can be moved from the current position to the target position while maintaining a gap between the vehicle body and an object (e.g., another vehicle, a curb stone, and a guardrail) at a predetermined distance or longer. The movement path may also be calculated by one of various known calculation methods (e.g., a method proposed in Japanese Patent Application Laid-open No. 2015-3565).

When the vehicle cannot move to the target position merely by moving the vehicle backward only once, the parking assist ECU 10 calculates the movement path as follows. For example, the parking assist ECU 10 calculates a first path for moving the vehicle forward to a travel-direction switching position from the current position, and a second path for moving the vehicle in reverse from the travel-direction switching position to the target position. The travel-direction switching position is a position at which the vehicle is to temporarily stop in order to switch the shift position of the transmission 24 from the forward drive position to the reverse drive position.

As the parking assist ECU 10 determines the movement path, the parking assist ECU 10 determines/sets movement assist information for moving the vehicle along the movement path. The movement assist information includes a movement direction of the vehicle (specifically, the shift position of the transmission 24), a steering angle pattern and a speed pattern.

The parking assist ECU 10 transmits a shift control command to the SBW ECU 41 via the CAN 90 in accordance with the determined shift position. When the shift control command has been received from the parking assist ECU 10, the SBW ECU 41 drives the SBW actuator 43 to change the shift position of the transmission 24 to the position specified by the shift control command (i.e., performs shift control).

The steering angle pattern is data in which the position of the vehicle on the movement path and the steering angle of the steered wheels are associated with each other, and represents changes in the steering angle (i.e., target steering angle) while the vehicle moves along the movement path. The parking assist ECU 10 transmits a steering command (including the target steering angle) to the EPS ECU 51 via the CAN 90 in accordance with the determined steering angle pattern. When the steering command has been received from the parking assist ECU 10, the EPS ECU 51 drives the assist motor 52 based on the steering torque specified by the steering command to cause the actual steering angle to match the target steering angle (i.e., performs steering angle control).

The speed pattern is data in which the position of the vehicle on the movement path and the vehicle speed (traveling speed) are associated with each other, and represents changes in the vehicle speed while the vehicle moves along the movement path. The parking assist ECU 10 transmits a driving force control command to the engine ECU 21 via the CAN 90 in accordance with the determined speed pattern. When the driving force control command has been received from the parking assist ECU 10, the engine ECU 21 controls the engine actuator 22 in accordance with the driving force control command (i.e., performs driving force control). The parking assist ECU 10 also transmits a braking force control command to the brake ECU 31 via the CAN 90 in accordance with the determined speed pattern. When the braking force control command has been received from the parking assist ECU 10, the brake ECU 31 controls the brake actuator 32 in accordance with the braking force control command (i.e., performs braking force control).

When the exit mode is selected as the assist mode, the parking assist ECU 10 performs the parking assist control in the same manner. That is, the parking assist ECU 10 sets the target region in the exit-possible region, and sets the position of the vehicle at the completion of the exit as the target position in the target region. The parking assist ECU 10 calculates the movement path for moving the vehicle from the current position to the target position. The parking assist ECU 10 determines/sets the movement assist information (including the movement direction of the vehicle, the steering angle pattern and the speed pattern) for moving the vehicle along the movement path. Then, the parking assist ECU 10 performs the shift control, the steering angle control, the driving force control, and the braking force control in accordance with the movement assist information.

As described above, the parking assist ECU 10 is configured to, in the situation in which the driver gets off the vehicle, perform the parking assist control including the shift control for changing the shift position of the transmission 24, the steering angle control for changing the steering angle of the steered wheels, the driving force control for controlling the driving force of the vehicle, and the braking force control for controlling the braking force of the vehicle.

In addition, the parking assist ECU 10 terminates the parking assist control when a predetermined termination condition is satisfied (e.g., the vehicle has reached the target position).

(Redundant Configuration of Electric Power Source)

Figure 2:
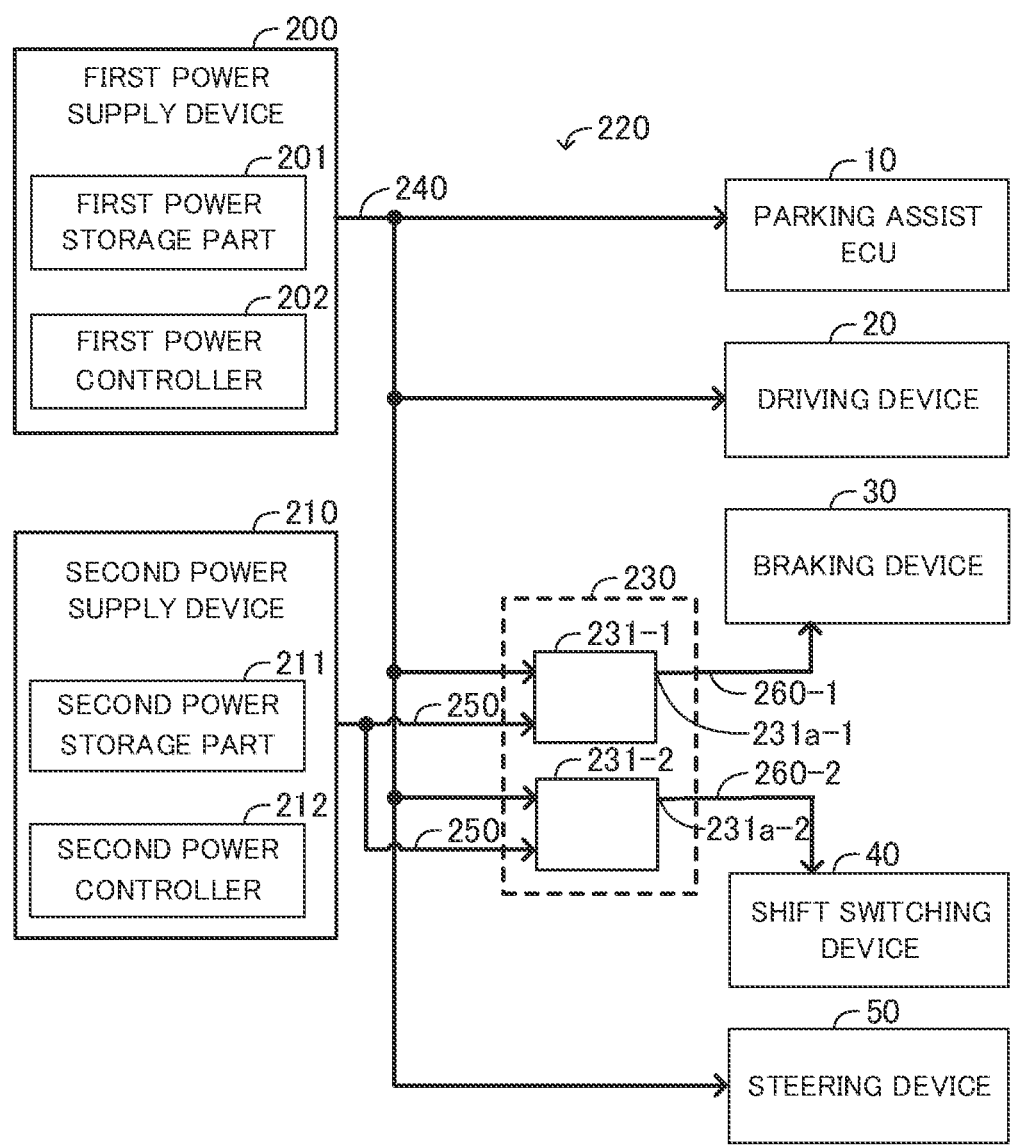
FIG. 2 is a diagram illustrating a connection relationship between components of the control apparatus illustrated in FIG. 1 and power supply devices (first power supply device and second power supply device) mounted on the vehicle.

As illustrated in FIG. 2, the vehicle includes a first power supply device 200, a second power supply device 210, and a power supply circuit 220.

The first power supply device 200 includes a first power storage part 201 and a first power controller 202. The first power storage part 201 is a power storage element capable of charging and discharging, and is, for example, a secondary battery. As the secondary battery, a lithium-ion battery or a nickel hydrogen battery may be employed. The first power storage part 201 has a first power supply capacity. The first power controller 202 includes a charge/discharge circuit for controlling the charge and discharge of the first power storage part 201, an ECU for controlling the charge/discharge circuit, a known step-up/step-down circuit, and the like. The ECU of the first power controller 202 operates by using the electric power of the first power storage part 201. The first power controller 202 adjusts an output voltage of the first power storage part 201 to a predetermined first constant voltage V1 (>0).

The second power supply device 210 is a power source used when an abnormality (or failure) occurs in the first power supply device 200 during the performance of the parking assist control. The second power supply device 210 includes a second power storage part 211 and a second power controller 212. The second power storage part 211 is a power storage element capable of charging and discharging, and includes one or more capacitors. For example, the second power storage part 211 may be an electric double layer capacitor. The second power storage part 211 has a second power supply capacity. From the viewpoint of the load size and cost in the vehicle, the second power supply capacity of the second power storage part 211 is smaller than the first power supply capacity of the first power storage part 201.

In the above configuration, the second power storage part 211 is charged by using the electric power of the first power storage part 201 when the first power supply device 200 is operating normally. The second power storage part 211 may be a secondary battery in the same manner as the first power storage part 201.

The second power controller 212 includes a charge/discharge circuit for controlling the charge and discharge of the second power storage part 211, an ECU for controlling the charge/discharge circuit, a known step-up/step-down circuit, and the like. The ECU of the second power controller 212 operates by using the electric power of the second power storage part 211. The second power controller 212 adjusts an output voltage of the second power storage part 211 to a predetermined second constant voltage V2 (>0). The second voltage V2 is smaller than the first voltage V1.

Further, the ECU of the second power controller 212 can detect an abnormality in the second power storage part 211. When the parking assist control is started, the ECU of the second power controller 212 determines whether an abnormality occurs in the second power storage part 211. For example, when the voltage of the capacitor of the second power storage part 211 is equal to or lower than a predetermined voltage, the ECU of the second power controller 212 determines that the abnormality occurs in the second power storage part 211 because the power of the second power storage part 211 is insufficient. When the abnormality occurs in the second power storage part 211, the ECU of the second power controller 212 notifies the parking assist ECU 10 that the abnormality occurs in the second power storage part 211 via the CAN 90.

The power supply circuit 220 includes a power supply redundancy circuit 230, a first power supply line 240, and a second power supply line 250. The first power supply line 240 extends from the first power supply device 200, and is connected to the parking assist ECU 10, the driving device 20, the steering device 50, and the power supply redundancy circuit 230. The second power supply line 250 extends from the second power supply device 210, and is connected to the power supply redundancy circuit 230.

Figure 3:
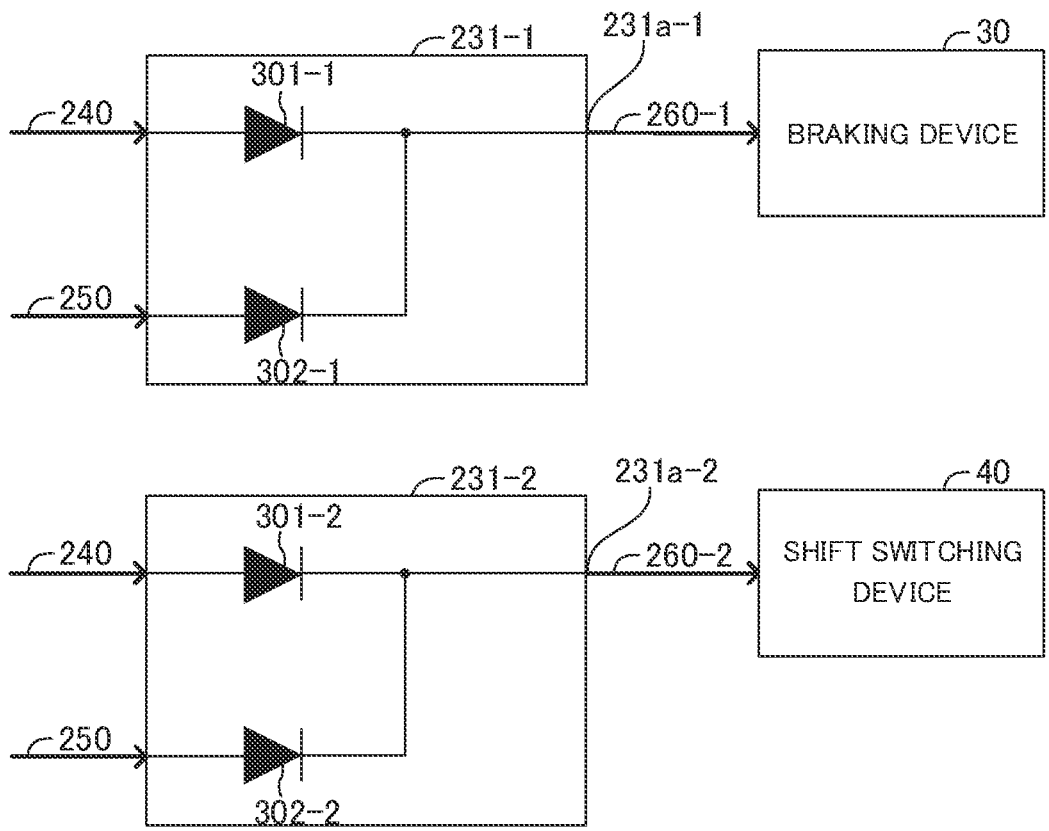
FIG. 3 is a diagram illustrating a configuration of each of selection circuits illustrated in FIG. 2.

As illustrated in FIG. 2, the power supply redundancy circuit 230 includes a first selection circuit 231-1 and a second selection circuit 231-2. The first selection circuit 231-1 and the second selection circuit 231-2 select either the electric power of the first power storage part 201 supplied through the first power supply line 240 or the electric power of the second power storage part 211 supplied through the second power supply line 250, and output the selected electric power, respectively. As illustrated in FIG. 3, the first selection circuit 231-1 and the second selection circuit 231-2 are "diode OR circuits", respectively.

The first selection circuit 231-1 includes a first diode 301-1 having an anode connected to the first power supply line 240, and a second diode 302-1 having an anode connected to the second power supply line 250. A cathode of the first diode 301-1 and a cathode of the second diode 302-1 are connected to an output terminal 231a-1 of the first selection circuit 231-1, respectively. The output terminal 231a-1 of the first selection circuit 231-1 is connected to an output line 260-1. The output line 260-1 is connected to the braking device 30.

The second selection circuit 231-2 includes a first diode 301-2 having an anode connected to the first power supply line 240, and a second diode 302-2 having an anode connected to the second power supply line 250. A cathode of the first diode 301-2 and a cathode of the second diode 302-2 are connected to an output terminal 231a-2 of the second selection circuit 231-2, respectively. The output terminal 231a-2 of the second selection circuit 231-2 is connected to an output line 260-2. The output line 260-2 is connected to the shift switching device 40.

Since the first selection circuit 231-1 and the second selection circuit 231-2 have the same configuration, the operation of the first selection circuit 231-1 will be described below. The first selection circuit 231-1 selects and outputs the electric power having the higher one of the voltage of the anode of the first diode 301-1 and the voltage of the anode of the second diode 302-1. Specifically, in the first selection circuit 231-1, when the voltage applied to the first diode 301-1 through the first power supply line 240 is higher than the voltage applied to the second diode 302-1 through the second power supply line 250, this makes the line from the first diode 301-1 to the output terminal 231a-1 conduct. In this case, the first selection circuit 231-1 outputs the electric power of the first power storage part 201 from the output terminal 231a-1 to the output line 260-1. The electric power of the first power storage part 201 is supplied to the braking device 30 through the output line 260-1.

On the other hand, when the voltage applied to the second diode 302-1 through the second power supply line 250 is higher than the voltage applied to the first diode 301-1 through the first power supply line 240, this makes the line from the second diode 302-1 to the output terminal 231a-1 conduct. In this case, the first selection circuit 231-1 outputs the electric power of the second power storage part 211 from the output terminal 231a-1 to the output line 260-1. The electric power of the second power storage part 211 is supplied to the braking device 30 through the output line 260-1.

Summary of Operation

When a state of an ignition switch (not shown) is changed from an OFF state to an ON state, the first power controller 202 applies the first voltage V1 to the first power supply line 240. The electric power of the first power storage part 201 is supplied to the parking assist ECU 10, the driving device 20, and the steering device 50 through the first power supply line 240. Further, the electric power of the first power storage part 201 is supplied to the power supply redundancy circuit 230 through the first power supply line 240. The electric power of the first power storage part 201 is supplied to the braking device 30 and the shift switching device 40 through the power supply redundancy circuit 230. Accordingly, the parking assist ECU 10, the driving device 20, the braking device 30, the shift switching device 40, and the steering device 50 operate using the electric power of the first power storage part 201, respectively. Meanwhile, when the parking assist control is not performed, the electric power of the second power storage part 211 is not supplied to the power supply redundancy circuit 230.

Next, in the situation in which the parking assist control is performed, the operation of the vehicle control device will be described for the following cases (1) and (2):

(1) A case in which the first power supply device 200 normally operates, and (2) A case in which an abnormality (failure) occurs in the first power supply device 200.

(1) The case in which the first power supply device 200 normally operates.

When the parking assist ECU 10 receives the assist request signal and an execution condition described later is satisfied, the parking assist ECU 10 sends a start command to the second power controller 212. In response to the start command, the second power controller 212 applies the second voltage V2 to the second power supply line 250.

Thereafter, the parking assist ECU 10 determines the movement assist information (including the movement direction of the vehicle, the steering angle pattern and the speed pattern) as described above, and starts the parking assist control in accordance with the movement assist information. When the first power supply device 200 normally operates during the performance of the parking assist control, the parking assist ECU 10, the driving device 20 and the steering device 50 operate using the electric power (that is, the electric power of the first power storage part 201) supplied through the first power supply line 240. Further, since the voltage (V1) of the first power supply line 240 is higher than the voltage (V2) of the second power supply line 250, the first selection circuit 231-1 outputs the electric power of the first power storage part 201 supplied through the first power supply line 240 to the output line 260-1, and the second selection circuit 231-2 outputs the electric power of the first power storage part 201 supplied through the first power supply line 240 to the output line 260-2. Accordingly, the braking device 30 and the shift switching device 40 operate using the electric power of the first power storage part 201.

(2) The case in which the abnormality occurs in the first power supply device 200.

When the abnormality occurs in the first power supply device 200 while the parking assist control is being performed, the electric power of the first power storage part 201 is not supplied to the first power supply line 240. As a result, the voltage of the first power supply line 240 is decreased (for example, the voltage becomes zero). The parking assist ECU 10, the driving device 20 and the steering device 50 stop their operations, respectively. On the other hand, since the voltage (V2) of the second power supply line 250 becomes higher than the voltage (zero) of the first power supply line 240, the first selection circuit 231-1 outputs the electric power of the second power storage part 211 to the output line 260-1, and the second selection circuit 231-2 outputs the electric power of the second power storage part 211 to the output line 260-2. Accordingly, even in the case in which the abnormality has occurred in the first power supply device 200, the electric power of the second power storage part 211 is supplied to the braking device 30 through the first selection circuit 231-1 and to the shift switching device 40 through the second selection circuit 231-2. The braking device 30 and the shift switching device 40 can operate using the electric power of the second power storage part 211.

During the performance of the parking assist control, the parking assist ECU 10 communicates with the engine ECU 21, the brake ECU 31, the SBW ECU 41, and the EPS ECU 51 via the CAN 90 each time a predetermined time Tm elapses. That is, the parking assist ECU 10 transmits a command signal (including the control command described above) to each of those ECUs, and receives a response signal from each of those ECUs. When the abnormality occurs in the first power supply device 200, the electric power of the first power storage part 201 is not supplied to the parking assist ECU 10, so that the operation of the parking assist ECU 10 is stopped. As a result, the transmission of the command signal is stopped. Even in such a case, as described above, the braking device 30 and the shift switching device 40 operate using the electric power of the second power storage part 211.

When the communication with the parking assist ECU 10 is interrupted for a predetermined time threshold Tth or longer, the brake ECU 31 determines that the abnormality occurs in the first power supply device 200. Specifically, when the brake ECU 31 does not receive the command signal from the parking assist ECU 10 for the time threshold Tth or longer during the performance of the parking assist control, the brake ECU 31 determines that the abnormality occurs in the first power supply device 200. The time threshold Tth is longer than the predetermined time Tm. When determining that the abnormality occurs in the first power supply device 200, the brake ECU 31 performs braking force control for applying the braking force to the wheels. This control will be hereinafter referred to as "first control (or first fail-safe control)". The brake ECU 31 performs the first control to stop the vehicle before the vehicle reaches the target position.

Similarly, when the communication with the parking assist ECU 10 is interrupted for the time threshold Tth or longer, the SBW ECU 41 determines that the abnormality occurs in the first power supply device 200. That is, when the SBW ECU does not receive the command signal from the parking assist ECU 10 for the time threshold Tth or longer during the performance of the parking assist control, the SBW ECU 41 determines that the abnormality occurs in the first power supply device 200. When determining that the abnormality occurs in the first power supply device 200, the SBW ECU 41 performs shift control described below. Specifically, the SBW ECU 41 controls the SBW actuator 43 to change the shift position to the parking position. This control will be hereinafter referred to as "second control (or second fail-safe control)". By the second control, the state of the transmission 24 becomes the parking lock state. Therefore, it is possible to maintain the stopped state of the vehicle.

As described above, even when the abnormality occurs in the first power supply device 200 during the performance of the parking assist control, the braking device 30 and the shift switching device 40 both operate using the electric power of the second power storage part 211. The braking device 30 performs the first control, and the shift switching device 40 performs the second control. Accordingly, even in the case in which the abnormality occurs in the first power supply device 200 during the performance of the parking assist control in the situation in which the driver gets off the vehicle, the vehicle can be stopped.

When the abnormality occurs in the first power supply device 200, it is deemed desirable to stop the vehicle as soon as possible. For this purpose, the inventors of the present application have studied a configuration in which the vehicle control apparatus simultaneously starts the first control and the second control when the abnormality occurs in the first power supply device 200. In this configuration, since the braking device 30 applies a large braking force to the wheels to stop the vehicle, a current (load current) flowing from the second power storage pad 211 to the braking device 30 is temporarily increased immediately after the braking device 30 starts the first control. At the same time, since the shift switching device 40 changes the shift position of the transmission 24 to the parking position, a current (load current) flowing from the second power storage part 211 to the shift switching device 40 is also temporarily increased.

Hereinafter, the load current flowing from the second power storage part 211 to the braking device 30 will be referred to as "first load current", and the load current flowing from the second power storage part 211 to the shift switching device 40 will be referred to as "second load current". As described above, when the vehicle control apparatus starts the first control and the second control simultaneously, a timing at which the first load current reaches a peak overlaps in time with a timing at which the second load current reaches a peak. Therefore, the sum of the load currents flowing from the second power storage part 211 to the loads (the braking device 30 and the shift switching device 40) becomes large. As described above, the power supply capacity of the second power storage part 211 is smaller than that of the first power storage part 201. When an attempt is made to output a large amount of current all at once from the second power storage part 211 having a small capacity, the voltage of the second power storage part 211 is rapidly decreased. As a result, sufficient current for operating the braking device 30 and the shift switching device 40 cannot be output from the second power storage part 211. This may cause the braking device 30 and the shift switching device 40 not to operate. Accordingly, the vehicle control apparatus cannot stop the vehicle.

In view of the above, when the abnormality occurs in the first power supply device 200, the braking device 30 starts the first control and the shift switching device 40 starts the second control such that the timing at which the first load current reaches the peak does not overlap with the timing at which the second load current reaches the peak. The "peak of the first load current" means a maximum value of the first load current while the braking device 30 performs the first control, and the "peak of the second load current" means a maximum value of the second load current while the shift switching device 40 performs the second control. This control will be described with reference to FIG. 4.

Figure 4:
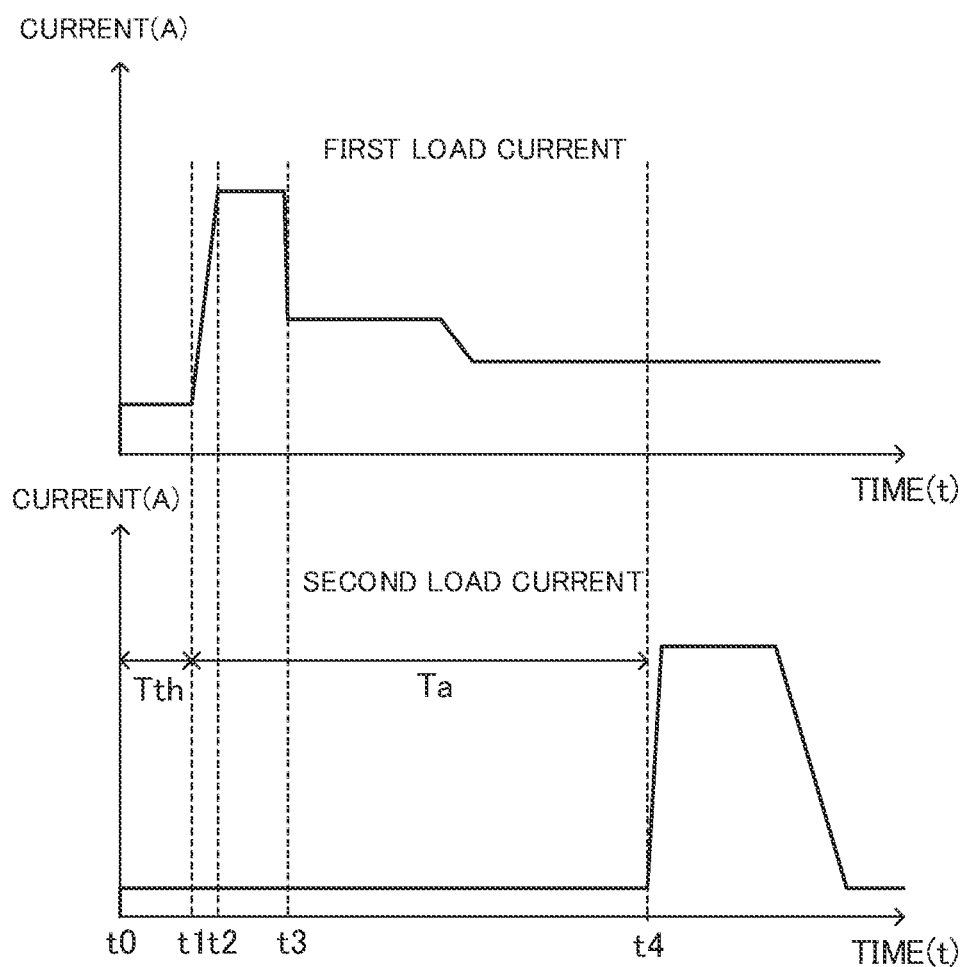
FIG. 4 is a diagram illustrating a change with time in a current (first bad current) flowing from the second power supply device to a braking device, and a change with time in a current (second load current) flowing from the second power supply device to a shift switching device after an abnormality occurs in the first power supply device.

In an example of FIG. 4, the parking assist control has been performed since before a time point t0. At the time point t0, it is assumed that the abnormality occurs in the first power supply device 200. After the time point t0, the first load current flows from the second power storage part 211 through the first selection circuit 231-1, and the second load current flows from the second power storage part 211 through the second selection circuit 231-2.

At a time point t1 at which the time threshold Tth has elapsed since the time point t0, the brake ECU 31 determines that the abnormality occurs in the first power supply device 200. Accordingly, the brake ECU 31 starts the first control at the time point t1 Specifically, the brake ECU 31 first executes a pressure increasing process for increasing the braking pressure of the wheel cylinder 33 to a predetermined first braking pressure. A large amount of current is required for this pressure increasing process. Therefore, the first load current reaches a peak (maximum value) at a time point t2.

Thereafter, at time point t3, the brake ECU 31 executes a pressure maintaining process for maintaining (keeping) the braking pressure of the wheel cylinder 33 at the first braking pressure. The amount of current required for the pressure maintaining process is smaller than the amount of current required for the pressure increasing process. Accordingly, the first load current is decreased with the shift from the pressure increasing process to the pressure maintaining process.

Meanwhile, at the time point t1, the SBW ECU 41 also determines that the abnormality occurs in the first power supply device 200. The SBW ECU 41 starts the second control at a time point t4 at which a predetermined first waiting time Ta has elapsed since the time point t1. The first waiting time Ta is set to be longer than a period from the time point t1 at which it is determined that the abnormality occurs in the first power supply device 200 to a time point at which the peak of the first load current is predicted to end. For example, the first waiting time Ta may be set in advance to be longer than the period (that is, the period from the time point t1 to the time point t3) during which the brake ECU 31 executes the pressure increasing process. According to this configuration, the timing at which the first load current reaches the peak does not overlap with the timing at which the second load current reaches the peak. The SBW ECU 41 can start the second control after the first load current becomes small.

According to the above configuration, the first load current reaches the peak before the time point t4, and the second load current reaches the peak after the time point t4. Since the timing at which the first load current reaches the peak does not overlap with the timing at which the second load current reaches the peak, it is possible to prevent the voltage of the second power storage part 211 from being rapidly decreased. Even in the configuration in which the second power storage part 211 has the power supply capacity smaller than that of the first power storage part 201, the braking device 30 and the shift switching device 40 can operate normally, and therefore, the vehicle can be surely stopped.

(Operation)

Next, the operation of the CPU (hereinafter simply referred to as "CPU1") of the parking assist ECU 10 will be described. The CPU1 executes the "perpendicular-parking assist execution routine" shown by a flowchart in FIG. 5 each time a "second time dT2 equal to or longer than the first time dT1" elapses.

When the ignition switch is changed from the OFF state to the ON state, the CPU1 executes an initialization routine (not shown) to set a value of a flag described below to "0". Further, as described above, in the case in which the abnormality occurs in the first power supply device 200, the electric power is not supplied to the parking assist ECU 10, and as a result, the operation of the parking assist ECU 10 is stopped. In this case, when the supply of the electric power to the parking assist ECU 10 is resumed thereafter, the CPU1 executes the initialization routine to set the value of the flag to "0".

Further, when the ignition switch is changed from the OFF state to the ON state, the first power controller 202 of the first power supply device 200 applies the first voltage V1 to the first power supply line 240.

Furthermore, each time the first time dT1 elapses, the CPU1 executes a routine (not shown) to acquire the vehicle peripheral information from the vehicle peripheral sensors 60. In addition, each time the first time dT1 elapses, the CPU1 executes a routine (not shown) to update the two-dimensional map based on the vehicle peripheral information.

Figure 5:
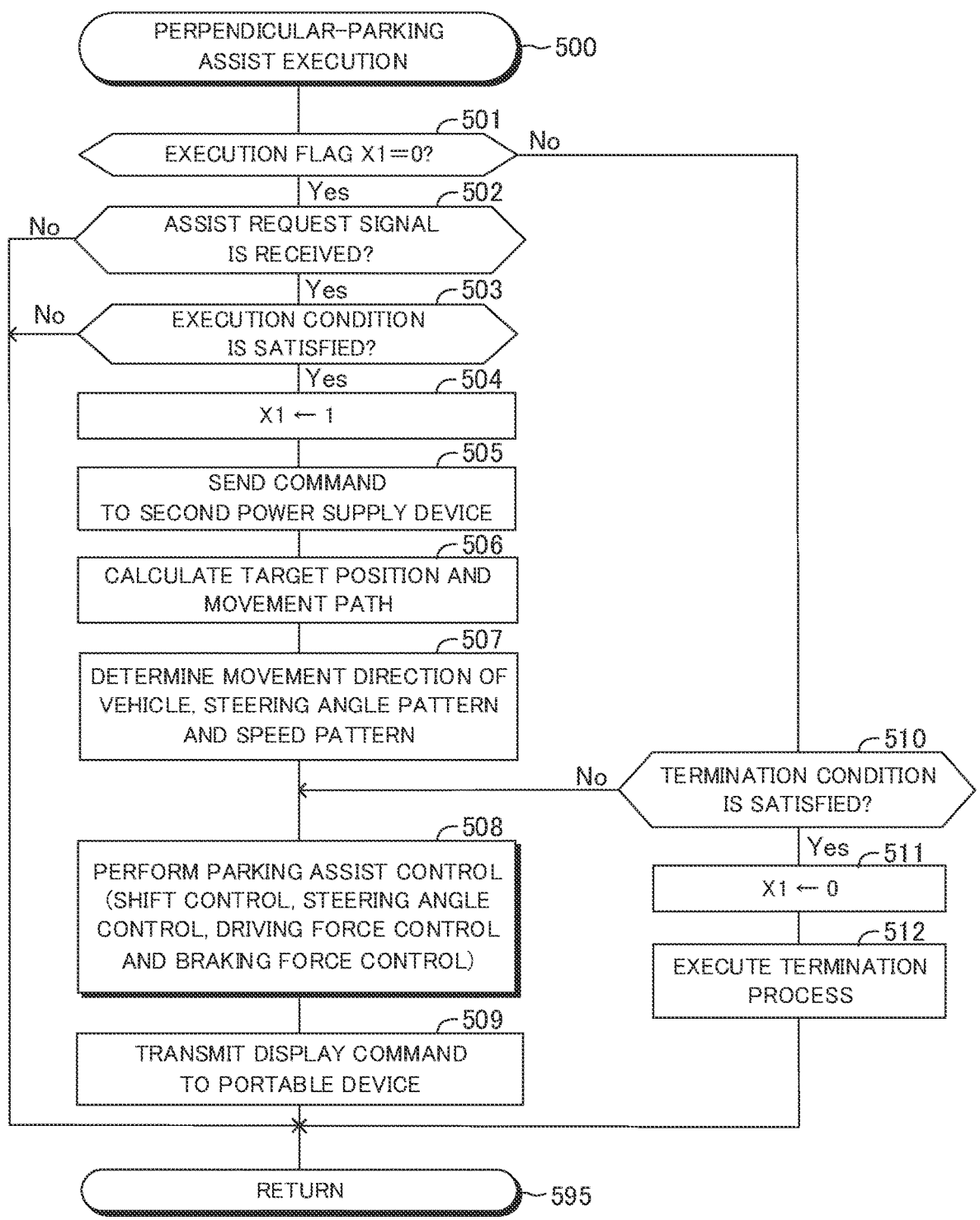
FIG. 5 is a flowchart illustrating a "perpendicular-parking assist execution routine" to be executed by a CPU of a parking assist ECU.

When a predetermined timing is reached, the CPU1 starts the processing from Step 500 of FIG. 5, and proceeds to Step 501. In Step 501, the CPU1 determines whether a value of a parking assist execution flag X1 (hereinafter simply referred to as "execution flag X1") is "0". When the value of the execution flag X1 is "0", this means that the parking assist control is not being performed. When the value of the execution flag X1 is "1", this means that the parking assist control is being performed.

When it is assumed that the value of the execution flag X1 is "0", the CPU1 makes a "Yes" determination in Step 501, and proceeds to Step 502 to determine whether the assist request signal (including the information on the assist mode) is received from the portable device 82. When the assist request signal is not received, the CPU1 makes a "No" determination in Step 502, and proceeds directly to Step 595 to end the current execution of the present routine.

When it is assumed that the assist request signal is now received, the CPU1 makes a "Yes" determination in Step 502, and proceeds to Step 503 to determine whether a predetermined execution condition is satisfied. The execution condition is satisfied when all of the following conditions A1 to A5 are satisfied.

(Condition A1) The CPU1 receives the authentication completion signal from the verification ECU 71.

(Condition A2) The assist mode included in the assist request signal is the perpendicular-parking mode.

(Condition A3) The position of the shift lever is the parking position (P).

(Condition A4) The CPU1 detects the parking-possible region having a size and shape in which the vehicle can be parked in the perpendicular-parking manner.

(Condition A5) The CPU1 does not receive from the ECU of the second power controller 212 a notification that an abnormality occurs in the second power storage part 211. That is, the voltage of the capacitor of the second power storage part 211 is not less than the predetermined voltage.

When the execution condition is not satisfied, the CPU1 makes a "No" determination in Step 503, and proceeds directly to Step 595 to end the current execution of the present routine. In this case, the CPU1 may transmit a display command to the portable device 82. As the portable device 82 receives the display command, the portable device 82 displays on the parking application that the parking assist control for the perpendicular-parking cannot be performed.

On the other hand, when the execution condition is satisfied, the CPU1 makes a "Yes" determination in Step 503, and executes the processing of Steps 504 to 509 (described below) in sequence. Thereafter, the CPU1 proceeds to Step 595 to end the current execution of the present routine.

Step 504: The CPU1 sets the value of the execution flag X1 to "1".

Step 505: The CPU1 sends the start command to the ECU of the second power controller 212 of the second power supply device 210. Upon receiving the start command, the ECU of the second power controller 212 applies the second voltage V2 to the second power supply line 250.

Step 506: The CPU1 determines a region occupied by the vehicle body as the target region on the assumption that the vehicle is parked in the detected parking-possible region. The CPU1 sets the target position in the target region. In addition, the CPU1 calculates the movement path for moving the position of the vehicle from the current position to the target position.

Step 507: The CPU1 determines the movement assist information for moving the vehicle along the movement path. The movement assist information includes the movement direction of the vehicle (more specifically, the shift position of the transmission 24), the steering angle pattern, and the speed pattern.

Step 508: The CPU1 performs the parking assist control. Specifically, the CPU1 transmits the shift control command to the SBW ECU 41 in accordance with the determined shift position to thereby perform the shift control. The CPU1 transmits the steering command (target steering angle) to the EPS ECU 51 in accordance with the determined steering angle pattern to thereby perform the steering angle control. The CPU1 transmits the driving force control command to the engine ECU 21 in accordance with the determined speed pattern to thereby perform the driving force control. The CPU1 transmits the braking force control command to the brake ECU 31 in accordance with the determined speed pattern to thereby perform the braking force control.

Step 509: The CPU 1 transmits a display command to the portable device 82. As the portable device 82 receives the display command, the portable device 82 displays on the parking application that the parking assist control is being performed. Thereafter, the CPU1 proceeds to Step 595 to end the current execution of the present routine.

After the parking assist control is started, the CPU1 again starts the routine of FIG. 5, and proceeds to Step 501. The CPU1 makes a "No" determination in Step 501, and proceeds to Step 510. The CPU1 determines whether a predetermined termination condition is satisfied. The termination condition is satisfied when the vehicle reaches the target position.

When the termination condition is not satisfied, the CPU1 makes a "No" determination in Step 510, and proceeds to Step 508 to continue the parking assist control (including the shift control, the steering angle control, the driving force control and the braking force control). Further, the CPU1 executes the processing of Step 509, and then, proceeds to Step 595 to end the current execution of the present routine.

On the other hand, when the termination condition is satisfied, the CPU1 makes a "Yes" determination in Step 510, and executes the processing of Steps 511 and 512 (described below) in sequence. Thereafter, the CPU1 proceeds to Step 595 to end the current execution of the present routine.

Step 511: The CPU1 sets the value of the execution flag X1 to "0".

Step 512: The CPU1 executes a predetermined termination processing. Specifically, the CPU1 performs the braking force control to stop the vehicle at the target position. Further, the CPU1 transmits the shift control command to the SBW ECU 41 to change the shift position of the transmission 24 to the parking position in the state in which the vehicle is stopped at the target position. In addition, the CPU1 transmits a display command to the portable device 82. As the portable device 82 receives the display command, the portable device 82 displays on the parking application that the parking assist control is terminated. Thereafter, the CPU1 changes the state of the ignition switch from the ON state to the OFF state.

Further, the CPU (hereinafter simply referred to as "CPU2") of the brake ECU 31 executes the "first control execution routine" shown by a flowchart in FIG. 6 each time the second time dT2 elapses.

Figure 6:
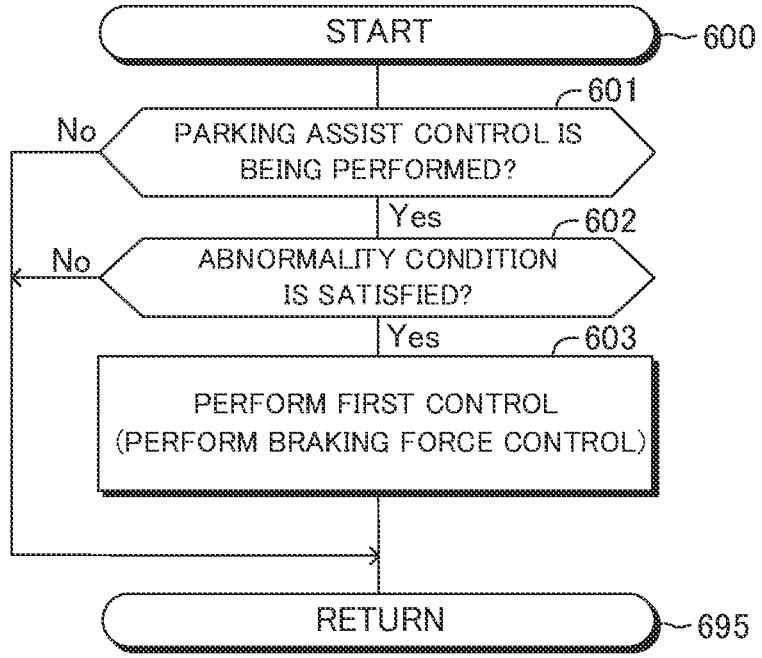
FIG. 6 is a flowchart illustrating a "first control execution routine" to be executed by a CPU of a brake ECU.

When a predetermined timing is reached, the CPU2 starts the processing from Step 600 of FIG. 6, and proceeds to Step 601 to determine whether the parking assist control is being performed. When the parking assist control is not being performed at the present time, the CPU2 makes a "No" determination in Step 601, and proceeds directly to Step 695 to end the current execution of the present routine.

Meanwhile, when the parking assist control is being performed, the CPU2 makes a "Yes" determination in Step 601, and proceeds to Step 602 to determine whether a predetermined abnormality condition is satisfied. The abnormality condition is satisfied when the command signal from the parking assist ECU 10 is not received for the time threshold Tth or longer. When the abnormality condition is not satisfied, the CPU2 makes a "No" determination in Step 602, and proceeds directly to Step 695 to end the current execution of the present routine.

Now, it is assumed that the voltage of the first power supply line 240 becomes zero because the abnormality occurs in the first power storage part 201 of the first power supply device 200. In this case, the operation of the parking assist ECU 10 is stopped. Since the second voltage V2 of the second power supply line 250 becomes higher than the voltage of the first power supply line 240, the first load current flows from the second power storage part 211 through the first selection circuit 231-1. Thus, even when the abnormality occurs in the first power supply device 200, the CPU2 can operate.

Since the abnormality condition is satisfied from the above assumption, the CPU2 makes a "Yes" determination in Step 602, and proceeds to Step 603 to perform the first control. Specifically, the CPU2 controls the brake actuator 32 to perform the pressure increasing process and the pressure maintaining process as described above. Thus, the vehicle is stopped. Thereafter, the CPU2 proceeds to Step 695 to end the current execution of the present routine.

Further, the CPU (hereinafter simply referred to as "CPU3") of the SBW ECU 41 executes the "second control execution routine" shown by a flowchart in FIG. 7 each time the second time dT2 elapses.

Figure 7:
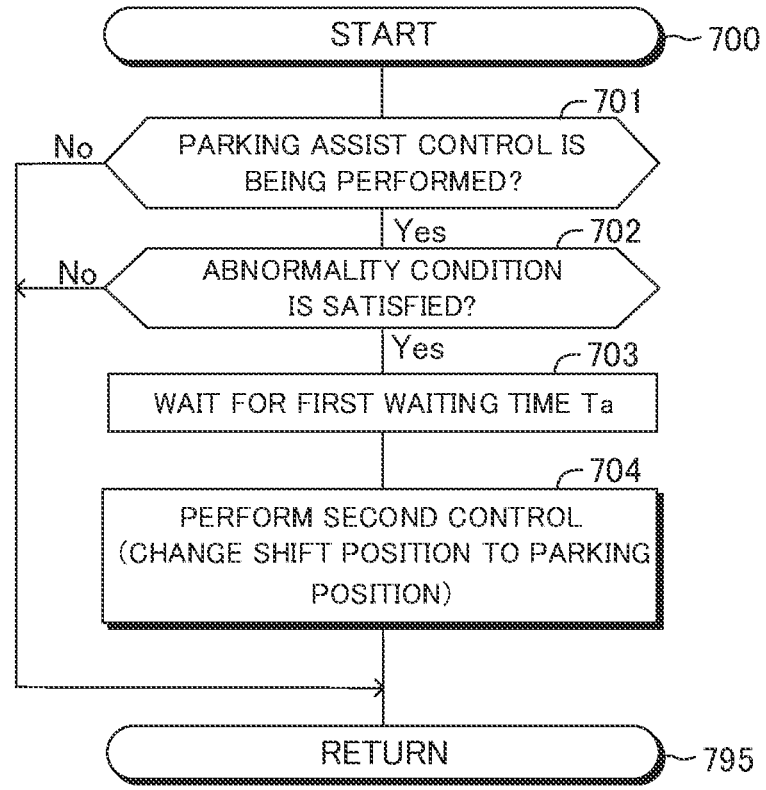
FIG. 7 is a flowchart illustrating a "second control execution routine" to be executed by a CPU of an SBW ECU.

When a predetermined timing is reached, the CPU3 starts the processing from Step 700 of FIG. 7, and proceeds to Step 701 to determine whether the parking assist control is being performed. When the parking assist control is not being performed at the present time, the CPU3 makes a "No" determination in Step 701, and proceeds directly to Step 795 to end the current execution of the present routine.

Meanwhile, when the parking assist control is being performed, the CPU3 makes a "Yes" determination in Step 701, and proceeds to Step 702 to determine whether the abnormality condition is satisfied as described above. When the abnormality condition is not satisfied, the CPU3 makes a "No" determination in Step 702, and proceeds directly to Step 795 to end the current execution of the present routine.

It is assumed that the abnormality occurs in the first power storage part 201 of the first power supply device 200. In this case, the second load current flows from the second power storage part 211 through the second selection circuit 231-2. Thus, even when the abnormality occurs in the first power supply device 200, the CPU3 can operate.

Since the abnormality condition is satisfied from the above assumption, the CPU3 makes a "Yes" determination in Step 702, and executes the processing of Steps 703 and 704 (described below) in sequence. Thereafter, the CPU3 proceeds to Step 795 to end the current execution of the present routine.

Step 703: The CPU3 waits for the first waiting time Ta. As described above, while the CPU3 waits for the first waiting time Ta, the CPU2 performs the first control to thereby stop the vehicle.

Step 704: The CPU3 performs the second control. Specifically, the CPU3 controls the SBW actuator 43 to change the shift position to the parking position.

According to the configuration described above, when the abnormality occurs in the first power supply device 200 during the performance of the parking assist control the braking device 30 operates using the electric power of the second power storage part 211 supplied through the first selection circuit 231-1, and the shift switching device 40 operates using the electric power of the second power storage part 211 supplied through the second selection circuit 231-2. The braking device 30 starts the first control at the time point at which it is determined that the abnormality occurs in the first power supply device 200. On the other hand, the SBW ECU 41 starts the second control when the first waiting time Ta has elapsed since the time point at which it is determined that the abnormality occurs in the first power supply device 200. According to this configuration, since the timing at which the first load current reaches its peak (maximum value) and the timing at which the second load current reaches its peak (maximum value) do not overlap, it is possible to prevent the voltage of the second power storage part 211 from being rapidly decreased. Since the braking device 30 and the shift switching device 40 can operate normally, the vehicle can be surely stopped.

Further, since the shift switching device 40 starts the second control after the braking device 30 starts the first control, this enables to enhance the possibility that the shift switching device 40 switches the shift position to the parking position in the state in which the vehicle is stopped.

The present disclosure is not limited to the embodiment described above, and various modification examples can be adopted within the scope of the present disclosure.

Modification Example 1

The brake ECU 31 may measure an elapsed time Te since the time point at which the brake ECU 31 starts the first control. In this configuration, when the elapsed time Te reaches the first waiting time Ta, the brake ECU 31 transmits a control signal for starting the second control to the SBW ECU 41 via the CAN 90. The SBW ECU 41 starts the second control in response to the control signal.

Modification Example 2

The brake ECU 31 and the SSW ECU 41 may be integrated into one ECU (hereinafter referred to as "integrated ECU"). In this configuration, when the integrated ECU determines that the abnormality condition is satisfied during the performance of the parking assist control, the integrated ECU starts the first control. The integrated ECU measures the elapsed time Te. When the elapsed time Te reaches the first waiting time Ta, the integrated ECU starts the second control.

Modification Example 3

The parking assist ECU 10 may determine (set) the speed pattern such that a maximum value of the vehicle speed Vs during the performance of the parking assist control is less than the speed threshold Vsth. In this configuration, the SBW ECU 41 starts the second control at the time point at which the abnormality condition is satisfied during the performance of the parking assist control (that is, when determining that the abnormality occurs in the first power supply device 200). On the other hand, the brake ECU 31 starts the first control when a predetermined second waiting time Tb has elapsed since the time point at which it is determined that the abnormality condition is satisfied during the performance of the parking assist control. The second waiting time Tb is set to be longer than a period from the time point at which it is determined that the abnormality condition is satisfied to a time point at which the peak of the second load current is predicted to end. For example, the second waiting time Tb is set to be longer than a time required for the shift position of the transmission 24 to be changed to the parking position. In this manner, the braking force may be applied to the wheels after the shift position of the transmission 24 is changed to the parking position. In this configuration as well, since the timing at which the first load current reaches its peak does not overlap with the timing at which the second load current reaches its peak, it is possible to prevent the voltage of the second power storage part 211 from being rapidly decreased. The braking device 30 and the shift switching device 40 can operate normally, and therefore, the vehicle can be surely stopped.

Modification Example 4

The brake ECU 31 and the SBW ECU 41 each may communicate with the first power supply device 200 to determine whether the abnormality occurs in the first power supply device 200. In this configuration, for example, the brake ECU 31 transmits a predetermined control signal to the ECU of the first power controller 202 each time a predetermined time elapses, and receives a response signal for the control signal. If the brake ECU 31 does not receive the response signal from the ECU of the first power controller 202 for the time threshold Tth or longer during the performance of the parking assist control, the brake ECU 31 may determine that the abnormality occurs in the first power supply device 200. In the same manner, the SBW ECU 41 may determine whether the abnormality occurs in the first power supply device 200.

Modification Example 5

In the first control, the brake ECU 31 may acquire the signal from each of the wheel speed sensors 34 to determine whether the vehicle is stopped. In this configuration, the brake ECU 31 may gradually reduce the braking pressure of the wheel cylinder 33 from the first braking pressure after determining that the vehicle is stopped.

Modification Example 6

For each of the parallel-parking mode and the exit mode, the parking assist ECU 10 performs the same control as in the perpendicular-parking mode described above except that the region (target region) in which the vehicle is to be finally moved is different from that in the perpendicular-parking. Therefore, the routine of FIG. 5, the routine of FIG. 6 and the routine of FIG. 7 can be applied to each of the parallel-parking mode and the exit mode.

In the case in which the parking assist ECU 10 performs the perking assist control in the parallel-parking mode, the execution condition in Step 503 of the routine of FIG. 5 is replaced with a condition to be satisfied when all of the following conditions B1 to B5 are satisfied.
(Condition B1) The CPU1 receives the authentication completion signal from the verification ECU 71.
(Condition B2) The assist mode included in the assist request signal is the parallel-parking mode.
(Condition B3) The position of the shift lever is the parking position (p).
(Condition B4) The CPU1 detects the parking-possible region having a size and shape in which the vehicle can be parked in the parallel-parking manner.
(Condition B5) The CPU1 does not receive from the ECU of the second power controller 212 the notification that the abnormality occurs in the second power storage part 211.

In the case in which the parking assist ECU 10 performs the perking assist control in the exit mode, the execution condition in Step 503 of the routine of FIG. 5 is replaced with a condition to be satisfied when all of the following conditions C1 to C5 are satisfied.
(Condition C1) The CPU1 receives the authentication completion signal from the verification ECU 71.
(Condition C2) The assist mode included in the assist request signal is the exit mode.
(Condition C3) The position of the shift lever is the parking position (P).
(Condition C4) The CPU1 detects the exit-possible region having a size and shape to which the vehicle can be moved.
(Condition C5) The CPU1 does not receive from the ECU of the second power controller 212 the notification that the abnormality occurs in the second power storage part 211.

A circuit other than a diode OR circuit may be employed as the first selection circuit 231-1 and the second selection circuit 231-2. For example, the power supply redundancy circuit 230 may include a so-called "relay circuit", The relay circuit includes a switch for switching a "first state" in which the first power supply line 240 and the output line (260-1 or 260-2) are connected, to a "second state" in which the second power supply line 250 and the output line (260-1 or 260-2) are connected. In this configuration, the power supply redundancy circuit 230 further includes an ECU configured to detect the abnormality in the first power supply device 200, and change the state of the switch from the first state to the second state in response to the detection of the abnormality in the first power supply device 200. The ECU configured to detect the abnormality may monitor, for example, whether the voltage of the second power supply line 250 is higher than the voltage of the first power supply line 240, and determine that the abnormality occurs in the first power supply device 200 when the voltage of the second power supply line 250 is higher than the voltage of the first power supply line 240.

Further, a circuit using a MOS-FET may be employed as the first selection circuit 231-1 and the second selection circuit 231-2. Also in this configuration, the selection circuit 231 can select either the electric power of the first power storage part 201 supplied through the first power supply line 240 or the electric power of the second power storage part 211 supplied through the second power supply line 250, and output the selected electric power.

The above configuration may be applied to valet-parking, for example. "Valet-parking" is control for automatically driving the vehicle in a parking lot, and automatically parking the vehicle in an empty space. A control apparatus configured to perform valet-parking assist control is provided not in the vehicle but in the parking lot. The control apparatus monitors the state of the parking lot (e.g., number of vehicles, number and location of empty space, etc.). The control apparatus transmits an instruction signal for performing the valley-parking assist control to the vehicle after the driver gets off the vehicle. This enables the vehicle to automatically travel in the parking lot, and automatically be parked in the empty space.

Furthermore, the above configuration may be applied to automated driving control. The automated driving control is control for automatically changing the speed of the vehicle, the steering angle of the steered wheels, etc., without any operation by the driver of the vehicle. In this configuration, the vehicle includes an automated driving ECU configured to perform the automated driving control. For example, the automated driving ECU controls the driving device 20, the braking device 30, the shift switching device 40, and the steering device 50 such that the speed of the vehicle matches (becomes equal to) a predetermined target speed and the steering angle of the steered wheels matches (becomes equal to) the target steering angle. When the abnormality occurs in the first power supply device 200 during the performance of the automated driving control, the braking device 30 performs the first control using the electric power supplied from the second power supply device 210, and the shift switching device 40 performs the second control using the electric power supplied from the second power supply device 210. In this configuration, the braking device 30 performs the first control and the shift switching device 40 performs the second control such that the timing at which the first load current reaches its peak (maximum value) does not overlap with the timing at which the second load current reaches its peak (maximum value).

In this configuration, the braking device 30 may start the first control at the time point at which it is determined that the abnormality occurs in the first power supply device 200. The shift switching device 40 may start the second control when the first waiting time Ta has elapsed since the time point at which it is determined that the abnormality occurs in the first power supply device 200. Further, the first waiting time Ta may be set in advance to be longer than the period during which the brake ECU 31 performs the pressure increasing process.

What is claimed is:

1. A control apparatus for a vehicle, comprising:
a driving device configured to apply a driving force to a drive wheel among wheels of the vehicle;
a braking device configured to apply a braking force to the wheels;
a shift switching device configured to switch a shift position of a transmission of the vehicle to one of a plurality of positions including a forward drive position, a reverse drive position, and a parking position;
a steering device configured to control a steering angle of a steered wheel among the wheels;
a controller configured to:
receive an assist request transmitted from a portable device via wireless communication,
determine, in response to the received assist request, a vehicle movement path from a current position of the vehicle to a predetermined target position of the vehicle, and
perform parking assist control for controlling the driving device, the braking device, the shift switching device, and the steering device such that the vehicle moves along the determined vehicle movement path;
a first power supply device mounted on the vehicle, and having a first power supply capacity;
a second power supply device mounted on the vehicle, and having a second power supply capacity smaller than the first power supply capacity; and
a power supply circuit configured to:
when the first power supply device is normal during the performance of the parking assist control, supply an electric power from the first power supply device to the driving device, the braking device, the shift switching device, the steering device, and the controller, and
when an abnormality occurs in the first power supply device during the performance of the parking assist control, supply an electric power from the second power supply device to the braking device and the shift switching device,
wherein:
when the abnormality occurs in the first power supply device during the performance of the parking assist control, the braking device performs first control and the shift switching device performs second control such that a timing at which a current flowing from the second power supply device to the braking device reaches a maximum value and a timing at which a current flowing from the second power supply device to the shift switching device reaches a maximum value do not overlap, the first control! being control for applying the braking force to the wheels, and the second control being control for switching the shift position to the parking position.

2. The control apparatus according to claim 1, wherein the braking device is configured to start the first control at a time point at which it is determined that the abnormality occurs in the first power supply device, and the shift switching device is configured to start the second control when a predetermined time has elapsed since the time point at which it is determined that the abnormality occurs in the first power supply device.

3. The control apparatus according to claim 2, wherein the braking device is configured to perform, as the first control, a pressure increasing process for increasing a braking pressure of a wheel cylinder of the drive wheel and a pressure maintaining process for maintaining the braking pressure of the wheel cylinder of the drive wheel, and the predetermined time is set longer than a period during which the braking device performs the pressure increasing process.

4. The control apparatus according to claim 1, wherein the braking device is configured to communicate with the controller during the performance of the parking assist control, and when the communication with the controller is interrupted for a predetermined time threshold or longer, determine that the abnormality occurs in the first power supply device, and perform the first control, and the shift switching device is configured to communicate with the controller during the performance of the parking assist control, and when the communication with the controller is interrupted for the predetermined time threshold or longer, determine that the abnormality occurs in the first power supply device, and perform the second control.

5. A control apparatus for a vehicle, comprising:

a driving device configured to apply a driving force to a drive wheel among wheels of the vehicle;

a braking device configured to apply a braking force to the wheels;

a shift switching device configured to switch a shift position of a transmission of the vehicle to one of a plurality of positions including a forward drive position, a reverse drive position, and a parking position;

a steering device configured to control a steering angle of a steered wheel among the wheels;

a controller configured to perform automated driving control for automatically controlling the driving device, the braking device, the shift switching device, and the steering device;

a first power supply device mounted on the vehicle, and having a first power supply capacity;

a second power supply device mounted on the vehicle, and having a second power supply capacity smaller than the first power supply capacity; and a power supply circuit configured to:

when the first power supply device is normal during the performance of the automated driving control, supply an electric power from the first power supply device to the driving device, the braking device, the shift switching device, the steering device, and the controller, and when an abnormality occurs in the first power supply device during the performance of the automated driving control, supply an electric power from the second power supply device to the braking device and the shift switching device, wherein:

when the abnormality occurs in the first power supply device during the performance of the automated driving control, the braking device performs first control and the shift switching device performs second control such that a timing at which a current flowing from the second power supply device to the braking device reaches a maximum value and a timing at which a current flowing from the second power supply device to the shift switching device reaches a maximum value do not overlap, the first control being control for applying the braking force to the wheels, and the second control being control for switching the shift position to the parking position.

* * * * *